United States Patent
Kumar

(10) Patent No.: US 7,660,773 B1
(45) Date of Patent: Feb. 9, 2010

(54) SYSTEM AND METHOD FOR THE USE OF AN ADAPTIVE MUTATION OPERATOR IN GENETIC ALGORITHMS

(75) Inventor: Rakesh Kumar, Framingham, MA (US)

(73) Assignee: The MathWorks, Inc., Natick, MA (US)

( * ) Notice: Subject to any disclaimer, the term of this patent is extended or adjusted under 35 U.S.C. 154(b) by 178 days.

(21) Appl. No.: 11/299,804

(22) Filed: Dec. 12, 2005

(51) Int. Cl.
*G06N 5/00* (2006.01)

(52) U.S. Cl. .......................................... 706/13; 706/45

(58) Field of Classification Search ................... 706/13, 706/12, 45
See application file for complete search history.

(56) References Cited

U.S. PATENT DOCUMENTS

| | | | | |
|---|---|---|---|---|
| 6,031,984 | A * | 2/2000 | Walser | 703/2 |
| 6,321,317 | B1 * | 11/2001 | Borowsky et al. | 711/170 |
| 7,043,462 | B2 * | 5/2006 | Jin et al. | 706/13 |
| 2005/0080979 | A1 * | 4/2005 | Wu et al. | 711/1 |

OTHER PUBLICATIONS

Michalewicz et al. "Genocop: A Genetic Algorithm for Numerical Optimization Problems with Linear Constraints" 1996, Communications of the ACM, vol. 39, Issues 12es, Dec. 1996, pp. 1-26.*
Michalewicz, et al., GENOCOP: a genetic algorithm for numerical optimization problems with linear constraints.*

* cited by examiner

*Primary Examiner*—Wilbert L Starks, Jr.
(74) *Attorney, Agent, or Firm*—Lahive & Cockfield, LLP; Kevin J. Canning; John S. Curran

(57) ABSTRACT

An adaptive mutation operator for a genetic algorithm that programmatically mutates individuals in a constrained optimization for a modeled system is discussed. The mutation operator takes into account linear and bound constraints in generating new mutated individuals. The mutation operator generates random mutation direction vectors and random initial step sizes. A mutated individual is generated and moved along a randomly chosen mutation direction vector a distance equal to the initial step size. The generated mutated individual is compared to the linear and bound constraints. In the event the generated mutated individual is located in an infeasible region, the illustrative embodiment of the present invention automatically adjusts the step size to a smaller value and generates another mutated individual along the chosen mutation direction vector. The process iterates until the generated individual is within the feasible region. The number of available valid mutation directions increases as the step size decreases.

21 Claims, 4 Drawing Sheets

| 10 | 11 | 12 | 13 | 14 | 15 |
|---|---|---|---|---|---|
| Point Vector A | -2.5 | 4 | 1.2 | 8.4 | 9.5 |

| 20 | 21 | 22 | 23 | 24 | 25 |
|---|---|---|---|---|---|
| Point Vector B | 3 | 4 | 1.2 | 8.4 | -6 |

SYSTEM AND METHOD FOR THE USE OF AN ADAPTIVE MUTATION OPERATOR IN GENETIC ALGORITHMS

FIELD OF THE INVENTION

The illustrative embodiment relates generally to genetic algorithms, and more particularly to the use of an adaptive mutation operator that is used to create new populations for genetic algorithms.

BACKGROUND

Genetic algorithms provide a technique for solving optimization problems that are based on natural selection, the process that drives biological evolution. Genetic algorithms may be used to solve optimization problems in the aerospace industry, structural design problems and civil engineering problems. A genetic algorithm iteratively modifies a population of individual solutions in order to create a new population. At each generation, the genetic algorithm selects better individuals from the current population to be parents and uses them to produce the children for the next generation. Over successive generations, the population "evolves" toward an "optimal solution. A genetic algorithm uses three main types of operations to create the next population from the current population namely elites, crossover, and mutation. Elites are individuals selected intact from the current population. Crossover is a technique to swap content from individuals in the current population to create new individuals for the next generation. The mutation operation is of special interest for the current discussion.

In a genetic algorithm, a mutation operator is a genetic operator used to maintain diversity in a population from one generation to the next. An example of a mutation operator involves the probability that some arbitrary element in a point vector (individual) will be changed from its original state. FIG. 1 illustrates a mutation example in which two elements are randomly chosen and changed to a random value. A point vector A (10) includes elements 11, 12, 13, 14 and 15. A second point vector B (20) is also shown where B is an example of an individual selected by mutating selected elements within point vector A. Point vector B (20) includes elements 21, 22, 23, 24 and 25. Element 11 was mutated into element 21 and Element 15 was mutated into element 25. The values of elements 12, 13 and 14 is the same of that of respective elements 22, 23 and 24. The mutation of the individuals helps prevent premature convergence in the overall population.

FIG. 2 illustrates in a graph 30 the effect of a mutation operation in a conventional unconstrained optimization problem with two decision variables. An individual P2 (34) is generated via a mutation operation on current individual P1 (32) in an unconstrained optimization problem.

Unfortunately, while existing mutation algorithms (or operators), such as uniform random mutation and Gaussian mutation, are very useful in unconstrained optimization, it is very difficult to perform a mutation operation in a linear or bound constrained optimization while maintaining feasibility (a feasible individual represents a possible solution to the problem being optimized). For example, in FIG. 3, a graph 40 depicts two linear constraints 46 and 48 and a point P1 (42). Conventional mutation operators that do not take into account the linear constraints 46 and 48 may generate an individual P2 (44) that is located outside the feasible region 50 and therefore not usable as a possible solution to the optimization problem.

BRIEF SUMMARY

The illustrative embodiment of the present invention provides an adaptive mutation operator for a genetic algorithm that programmatically mutates individuals in a constrained optimization for a modeled system. The mutation operator takes into account linear and bound constraints in generating new mutated individuals. The mutation operator generates random mutation direction vectors and random initial step sizes. A mutated individual is generated and moved along a randomly chosen mutation direction vector a distance equal to the step size. The generated mutated individual is checked against the linear and bound constraints. In the event the generated mutated individual is located in an infeasible region, the illustrative embodiment of the present invention automatically adjusts the step size to a smaller step size and generates another mutated individual along the previously chosen mutation direction vector. The process iterates until the generated individual is in the feasible region. The number of available valid mutation directions increases as the step size decreases.

In one embodiment, in a computing device a method of using an adaptive mutation operator in a genetic algorithm includes the steps of providing a first population of multiple individuals for an optimization problem for a modeled system. The individuals are individual solutions to an optimization problem that includes including linear and bound constraints. The method also includes the steps of selecting an individual for mutation and generating programmatically a finite number of mutation direction vectors and an initial step size. The method programmatically generates a mutated individual along a randomly chosen mutation direction vector using the initial step size. The method further includes the step of programmatically assessing whether the mutated individual is in a feasible region. The feasible region represents a region encompassing an acceptable solution to the optimization problem considering the linear and bound constraints. The method also mutates another individual based on an assessment that the mutated individual is not in a feasible region. The mutated another individual is mutated along the previously chosen mutation direction vector using a second step size programmatically reduced from the initial step size. The method additionally stores the mutated another individual as part of second population in a computer-readable medium based on an assessment that the mutated individual is in a feasible region.

In another embodiment, a system using an adaptive mutation operator in a genetic algorithm includes multiple computing devices communicating over a network with a first computing device. The multiple computing devices each provide a pool of individuals for an optimization problem. The individuals are individual solutions to the optimization problem and the pools collectively represent a first population. The optimization problem includes linear and bound constraints. The system also includes a first computing device that receives the first population from the multiple computing devices and includes a mutation operator. The mutation operator selects an individual for mutation and generates programmatically mutation direction vectors and an initial step size. A randomly chosen mutation direction vector and the initial step size are used to generate a mutated individual along the chosen mutation direction vector using the initial step size. The mutation operator further assesses programmatically whether the mutated individual is in a feasible region such that it represents a region encompassing an acceptable solution to the optimization problem considering the linear and bound constraints.

In another embodiment, a computing apparatus includes a first population of individual solutions for an optimization problem that includes linear and bound constraints. The computing apparatus also includes a genetic algorithm executed by the computing apparatus that includes a mutation operator. The mutation operator selects an individual from the first population for mutation and generates programmatically mutation direction vectors and an initial step size that are used to generate a mutated individual along the chosen mutation direction vector using the initial step size. The mutation operator further assesses programmatically whether the mutated individual is in a feasible region that represents a region encompassing acceptable solutions to the optimization problem considering the linear and bound constraints. The apparatus also includes a second population of individual solutions for the optimization problem that includes linear constraints and bounds. The second population includes at least one individual mutated using the mutation operator. The computing apparatus also includes a storage location for storing the second population.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION

The use of the adaptive mutation operator of the present invention provides an efficient mechanism for performing mutation in constrained optimization problems. The new mutation operator generates mutated points in a feasible region defined by linear and bound constraints and automatically corrects for individuals generated in an infeasible region. The illustrative embodiment of the present invention can handle linear and bound constraints explicitly without using an artificial penalty formulation thereby resulting in a more desirable mutated population.

Figures 1, 2:
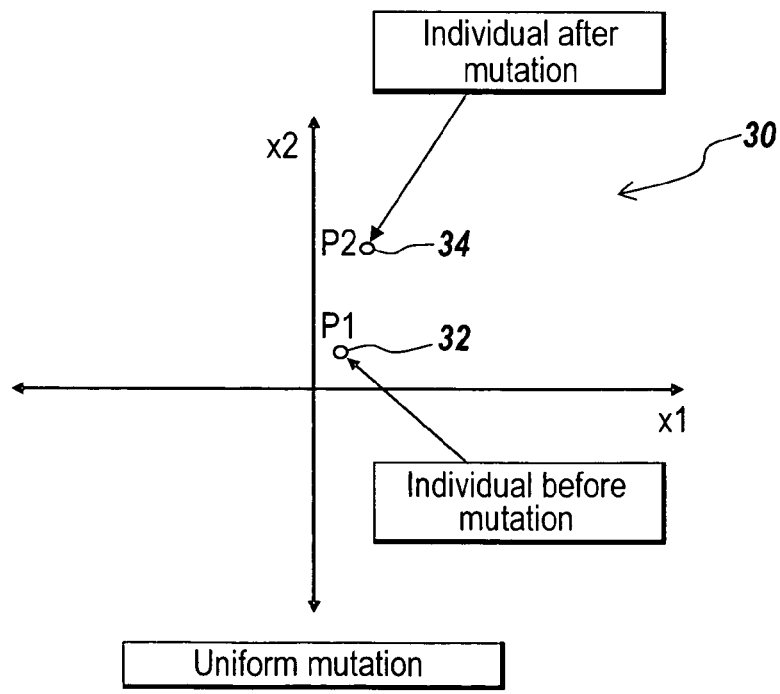
FIG. 1 (prior art) is a block diagram of a conventional mutation example.
FIG. 2 (prior art) is a graph of a conventional mutation operation in an unconstrained optimization.
Figure 3:
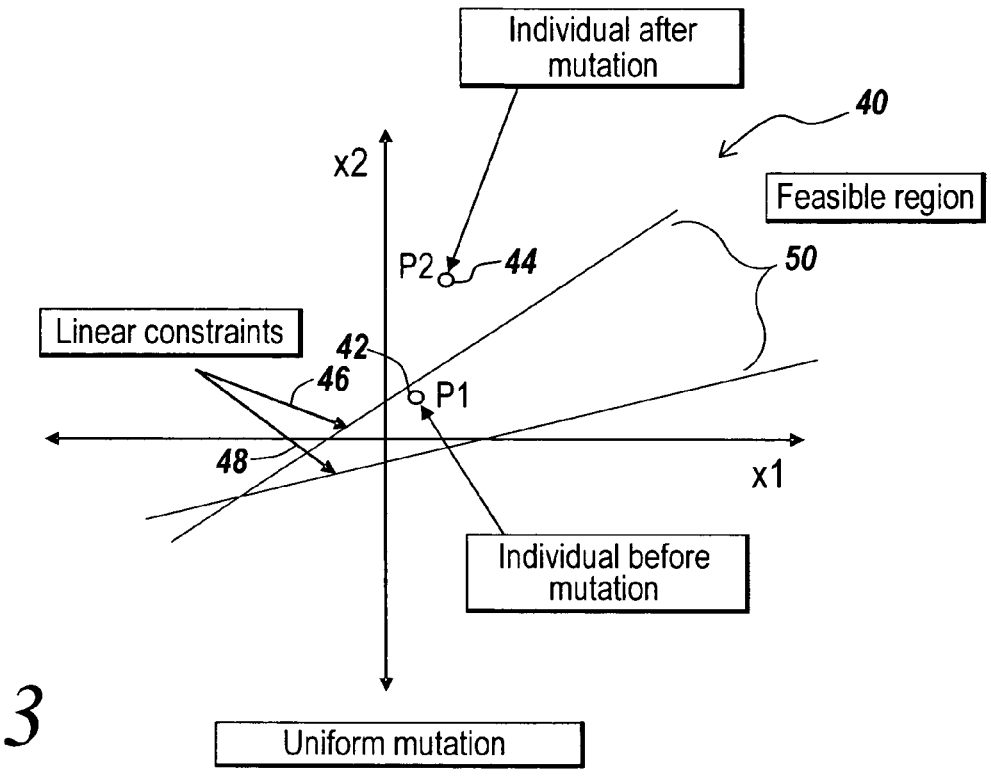
FIG. 3 (prior art) is a graph of the problems presented by attempting a conventional mutation operation in a constrained optimization.
Figure 4:
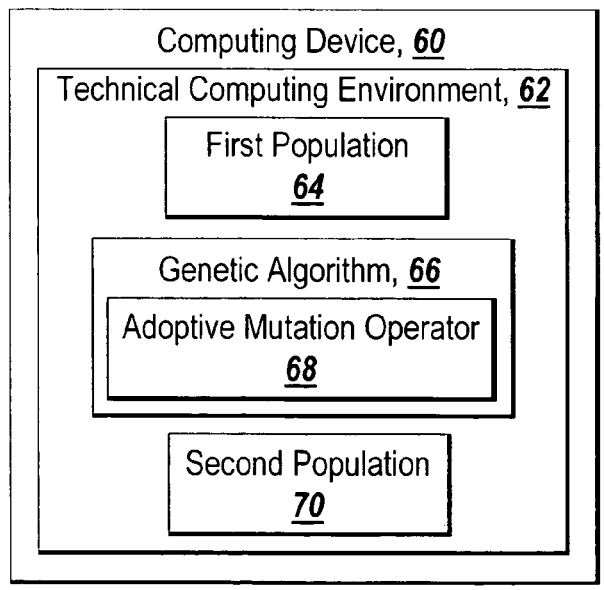
FIG. 4 depicts an environment suitable for practicing the illustrative embodiment of the present invention.

FIG. 4 depicts an environment suitable for practicing the illustrative embodiment of the present invention. A computing device 60 hosts a technical computing environment 62.

The computing device 60 may be a PC, workstation, server, laptop, mainframe, PDA or other computing device equipped with a processor and capable of hosting the technical computing environment 62. The computing device 60 may be equipped with a single processor, a multi-core processor, or multiple processors. The processor may be a 32 bit processor, 64 bit processor or some other type of processor capable of executing the instructions required for the present invention. The technical computing environment 62 may be any technical computing environment used to process constrained optimization problems. An exemplary technical computing environment is MATLAB from The MathWorks, Inc. of Natick, Mass.

The technical computing environment 62 includes a genetic algorithm 66 of the present invention. Those skilled in the art will appreciate that the genetic algorithm 66 may be practiced in other applications and environments. The genetic algorithm 66 includes an adaptive mutation operator 68 that is used to mutate individuals within a first population 64. The operation of the adaptive mutation operator is described further below. The first population 64 may be stored on the computing device 60 or at a location from which it may be accessed by the genetic algorithm 66. Following the processing of the first population by the genetic algorithm 66 a second population 70 holding individual solutions to the optimization problem is created. The second population 70 may also be stored on the computing device 60 or at a different location accessible to the genetic algorithm 66.

Figure 5:
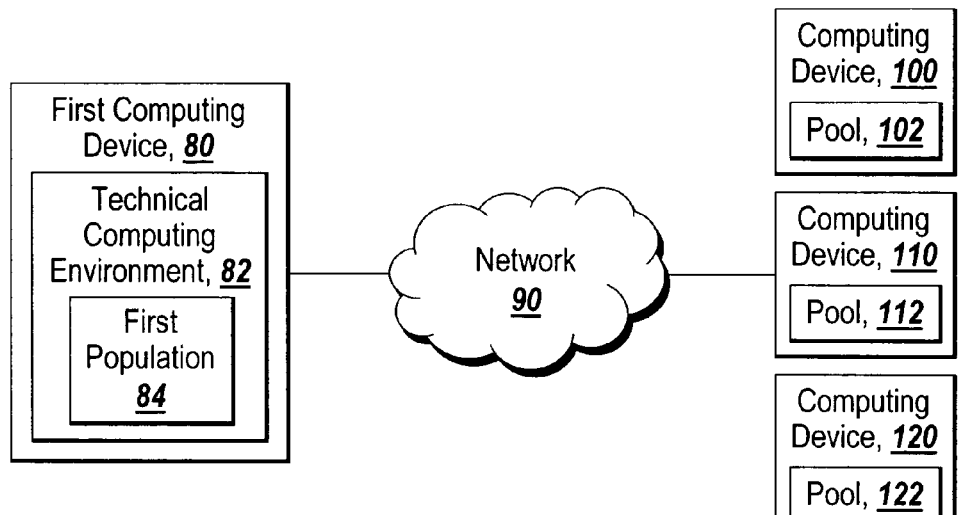
FIG. 5 depicts an alternate distributed environment suitable for practicing the illustrative embodiment of the present invention.

The illustrative embodiment of the present invention may also be practiced in a distributed or parallel environment. For example, FIG. 5 depicts an alternate distributed environment suitable for practicing the illustrative embodiment of the present invention. A first computing device 80 communicates over a network 90 with multiple computing devices 100, 102, and 104. The network 90 may be a Wide Area Network (WAN), Local Area Network (LAN), the Internet, an intranet or some other type of network over which the multiple computing devices 100, 110 and 120 can communicate with the first computing device 80. The multiple computing devices 100, 110 and 120 each separately create a pool of individuals 102, 112 and 122. The pools of individuals may be merged or otherwise combined to create a first population 84 that is transmitted to the technical computing environment 82 over the network 90. Alternatively, the pools 102, 112 and 122 may be separately transmitted to the technical computing environment 82 where they are combined into a first population which may be processed by the genetic algorithm 66. Other distributed and parallel architectures including thin-client and server-based computing architectures for practicing the present invention will be apparent to those skilled in the art. Similarly, it will be appreciated that various components discussed herein may be virtualized without departing from the scope of the present invention.

The adaptive mutation operator 68 generates mutated points in a feasible region defined by linear and bound constraints. The adaptive mutation operator 68 generates random directions called mutation direction vectors and uses a step size parameter to generate individuals along mutation direction vectors. The step size is changed throughout the optimization and is not fixed. The step size goes to zero towards the end of the optimization. A small number of mutation direction vectors are initially generated. The number of directions increases as the step size parameter decreases.

The algorithm for the adaptive mutation operator may be represented as follows:

Step 1: Let "Delta" be the current step size calculated as follows

If generation <=1
  Delta=1;
else
  If successful_last_generation
  Delta=max(1, Delta_last*4)
  else
  Delta=Delta_last/4
  end
end Step 2: Generate a set "D" which consist of minimum number of mutation directions (2*numberOfVariables).
  Generate a lower triangular matrix "B" whose diagonal elements are +/−1/sqrt(Delta), and other elements are integers between +1/sqrt(Delta) and −1/sqrt(Delta) (closed set). The columns of this matrix are linearly independent direction vectors because B is a lower triangular matrix.
  Randomly permute the rows and columns of B (The effect is to randomize direction vectors)
  Take the negative and positive of the set B i.e., [B −B] to produce the direction set D For each individual in the population to be mutated, repeat step 3 and 4

Step 3: Identify all the binding linear and bound constraints at the current individual which will form the current active-set of constraints. Find the set of tangent cone generators "T" of the active linear and bound constraints. Add the negative and positive of the tangent cone generators [T −T] to the set of mutation directions D. Replace D with [B −B] to represent mutation directions as [T −T B −B] which may be referred to as set M.

Step 4: For each mutation direction in the set, perform the following:
  Calculate a point "xtrial" along direction mi E M at a random distance.
  If isfeasible(xtrial)
  mutant=xtrial
  Return from the function
  else $i=i+1$ end It should be appreciated that it is possible that a point may not mutated because none of the mutation directions with the current step size produced a feasible point. However, the adaptive mutation operator does produce a feasible point for a step size Delta <=eps[where eps is a small number close to zero] using the mutation vector directions.

Figure 6:
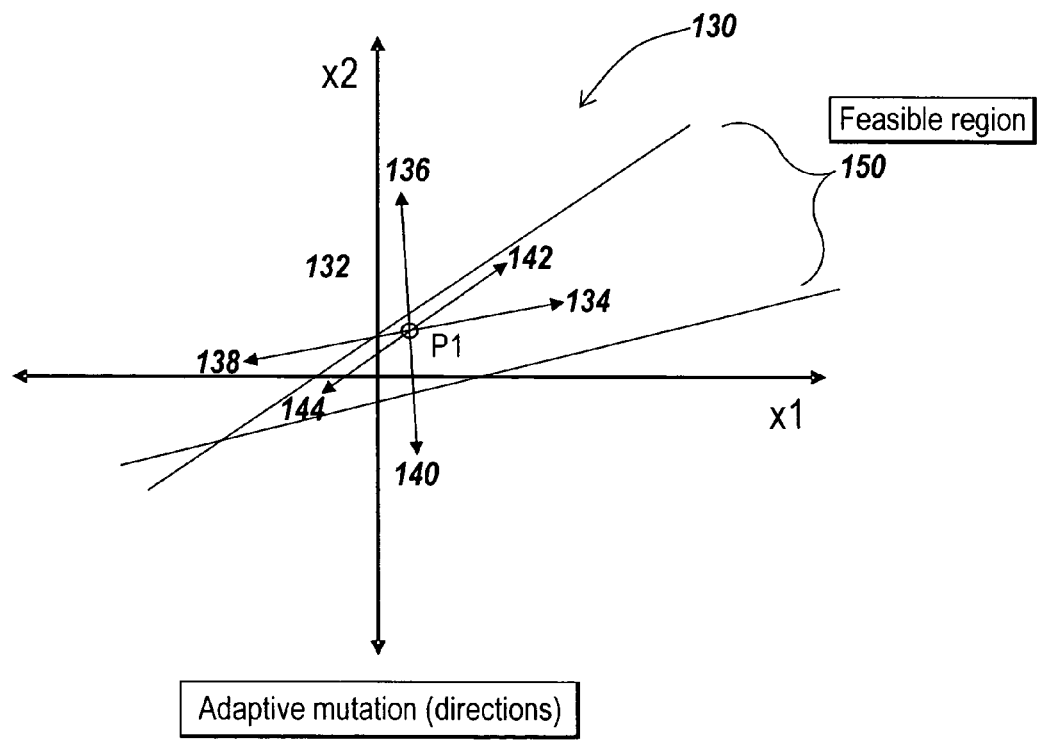
FIG. 6 is a graph depicting the use of mutation vector directions in a constrained operation by the illustrative embodiment of the present invention.

FIG. 6 shows a graph 130 showing the use of the adaptive mutation operator 68 to create mutation vector directions for a point P1 (132). The application of the adapter mutation operator 68 generates four mutation vector directions number 134, 136, 138 and 140 for point P1 (132) (generated from the step 2 above). Also, one active constraint is determined from step 3, which adds two more mutation vector directions 142 and 144. The adaptive mutation operator of the present invention uses direction vectors where a majority of the elements are nonzero. This is more effective than conventional mechanisms of perturbing only a couple of dimensions. Once the mutation vector directions 134, 136, 138, 140, 142, and 144 are generated, the adaptive mutation operator calculates the trial mutated individuals discussed in step 4 above.

It will be appreciated by those skilled in the art that the number of mutation directions depends on the step size. The number of directions can theoretically approach infinity as the step size parameter approaches zero. Because the adaptive mutation operator supports a large number of mutation direction vectors, the new population being created will have a greater variety of mutated individuals than was previously possible with conventional mechanisms for performing mutations in a genetic algorithm.

Figure 7:
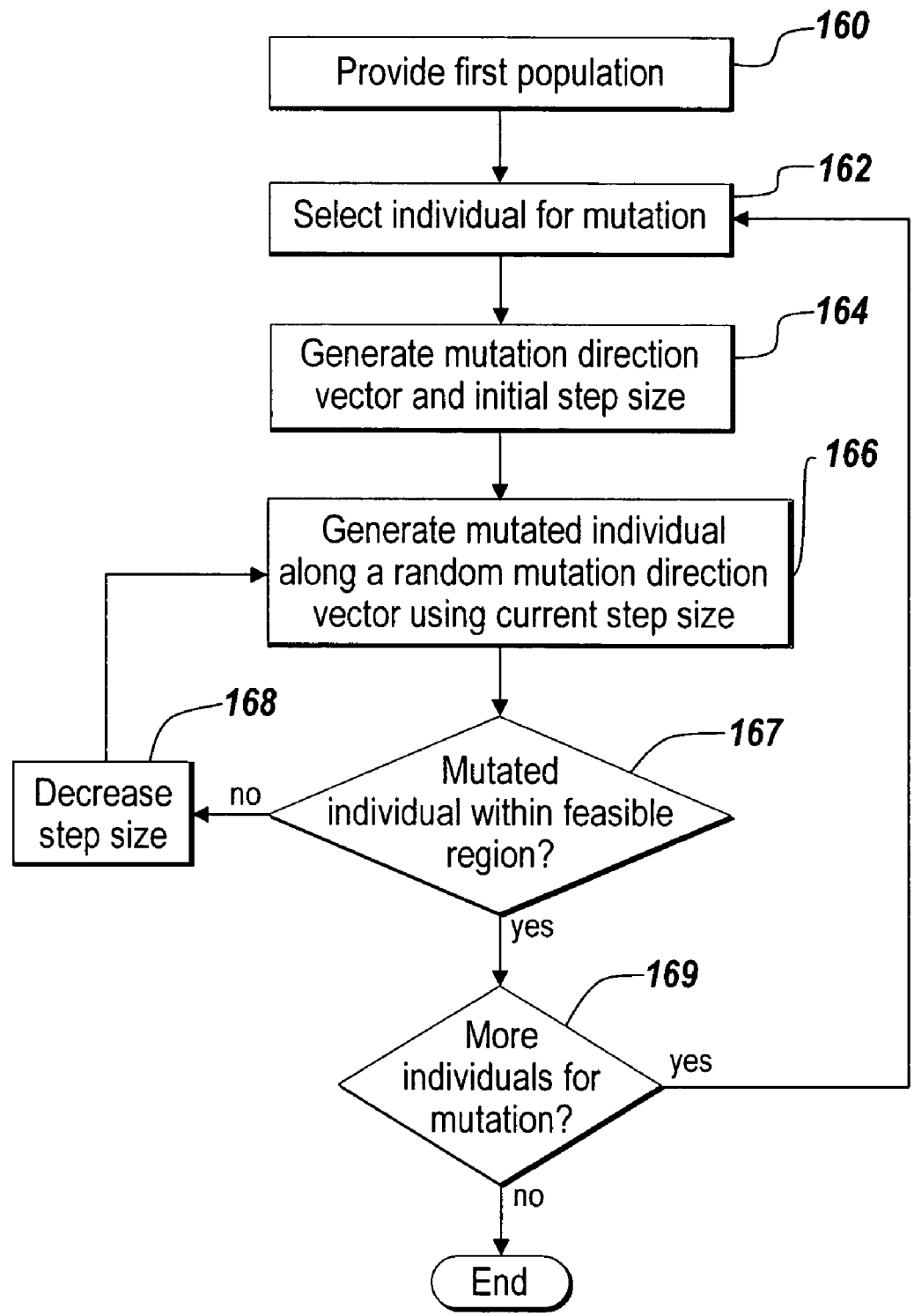
FIG. 7 is a flowchart of the sequence of steps followed by the illustrative embodiment of the present invention to utilize the adaptive mutation operator.

FIG. 7 depicts the sequence of steps followed by the illustrative embodiment of the present invention to mutate individuals in a constrained optimization problem for a modeled system using the adaptive mutation operator of the present invention. The sequence begins with the creation of the first population (step 160). An individual in the first population is then selected for mutation (step 162) and the adaptive mutation operator generates mutation direction vectors and an initial step size (step 164). The adaptive mutation operator then generates a mutated individual along a randomly chosen mutation direction vector using the initial/current step size (step 166). The mutated individual is then automatically examined by the adaptive mutation operator to determine whether the mutated individual is in a feasible region (step 167).

If the mutated individual is not located in a feasible region, the step size is automatically decreased (step 168) and the process iterates and generates another mutated individual along the mutation direction vector (step 166). In one implementation, the step size may be cut in half with each iteration. It will be appreciated by those skilled in the art that the step size may be reduced by other amounts such as a third or a quarter without departing from the scope of the present invention. If it is determined that the mutated individual is located within a feasible region (step 167), the adaptive mutation operator checks to see if more individuals have been selected for mutation (step 169). If more individuals are being mutated, the process iterates and the individual is selected for mutation (step 162) and mutation direction vectors and a new initial step size (step 164) are generated. If there are not more individuals to be mutated, the process ends and the genetic algorithm can examine the overall fitness of the newly created population as a solution for the optimization problem.

As noted above, mutation is one of three main types of operations used to create the next population from a current population with the other two types of operations being selection, where particular individuals named elites are selected for the new population intact, and crossover, where parts of separate individuals are combined to create new individuals. It will be appreciated that the new mechanism for performing mutation using the adaptive mutation operator of the present invention may be combined with conventional selection and crossover techniques to create new populations.

Although the discussion of the step size reduction process made reference to programmatically reducing the step size by a percentage value in those situations where it is detected that the mutated individual is in an infeasible region, those skilled in the art will recognize that other mechanisms for reducing the step size are possible within the scope of the present invention. For example, where it is determined that the mutated individual is located on the mutation direction vector in an infeasible region, the mutated individuals position may be automatically adjusted back to a point of intersection of the constraint and the mutation direction vector. Alternatively, the mutated individual's location may be adjusted from a position in an infeasible region back along the mutation direction vector to an offset inside the constraint along the mutation direction vector. These and other similar adjustment mechanisms are considered within the scope of the present invention.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include MATLAB, FORTRAN, C, C++, C#, or JAVA. The software programs may be stored on or in one or more mediums as object code. Hardware acceleration may be used and all or a portion of the code may run on a FPGA or an ASIC. The code may run in a virtualized environment such as in a virtual machine. Multiple virtual machines running the code may be resident on a single processor.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

I claim:

1. In a computing device, a computer-implemented method of solving an optimization problem for a modeled system using an adaptive mutation operator in a genetic algorithm, comprising:
    providing, to the computing device, a first population of a plurality of individuals for an optimization problem for a modeled system, the individuals being individual solutions to the optimization problem, the optimization problem including linear and bound constraints;
    selecting an individual for mutation using the computing device;
    generating programmatically, using the computing device, an initial step size;
    generating programmatically, using the computing device, a plurality of random mutation direction vectors extending from a plotted location representing the individual selected for mutation, the plurality of random mutation direction vectors based on the linear and bound constraints;
    generating programmatically, using the computing device, a mutated individual and moving a distance equal to the initial step size from the plotted location representing the individual selected for mutation along a randomly chosen one of the plurality of mutation direction vectors; and
    assessing programmatically, using the computing device, whether the mutated individual is in a feasible region, the feasible region representing a region encompassing acceptable solutions to the optimization problem considering the linear and bound constraints, the assessing further comprising:
        storing the mutated individual as part of second population in a computer-readable medium based on an assessment that the mutated individual is in the feasible region, or
        based on an assessment that the mutated individual is not in the feasible region, iteratively mutating a different mutated individual along the chosen mutation direction vector using a step size programmatically reduced from the initial step size and assessing whether the different mutated individual is in the feasible region until the different mutated individual is assessed to be in the feasible region, the reduced step size based on the linear and bound constraints, and
        storing the different mutated individual as part of a second population in a computer-readable medium based on an assessment that the different mutated individual is in the feasible region; and
    using the second population to solve the optimization problem.

2. The method of claim 1, further comprising:
generating a plurality of mutation direction vectors after selecting the individual for mutation; and
generating a different mutated individual along each of the plurality of mutation direction vectors using the initial step size.

3. The method of claim 2; further comprising:
assessing programmatically each mutated individual generated along the plurality of mutation direction vectors to determine whether each mutated individual is in the feasible region, the feasible region representing an acceptable solution to the optimization problem considering the linear and bound constraints;
identifying at least one mutated individual that is not in the feasible region on its selected mutation direction vector; and
for each of the identified individuals, mutating another mutated individual along the selected mutation direction vector using a second step size programmatically reduced from the initial step size.

4. The method of claim 1, further comprising:
based on a programmatic assessment that the individual mutated using the programmatically reduced step size is not in the feasible region, mutating another individual along the chosen mutation direction vector using a different step size programmatically reduced from the step size used in the previous mutation.

5. The method of claim 1, further comprising:
generating programmatically, in response to the generation of a reduced step size, at least one new mutation direction vector and at least one new mutated individual for the new mutation direction.

6. The method of claim 5 wherein the number of mutation directions is increased for each reduction in step size.

7. The method of claim 1 wherein the mutated individual is located in the feasible region and becomes part of a new population.

8. The method of claim 7 wherein the new population also includes individuals created by crossover.

9. The method of claim 7 wherein the new population also includes individuals selected directly from the first population.

10. The method of claim 7 wherein the new population includes pools of individuals created separately in a parallel computing environment.

11. The method of claim 1 wherein the linear and bound constraints are incorporated into the calculation of the generation of the mutation direction vector.

12. The method of claim 1, further comprising:
providing a plurality of computing devices communicating over a network with the computing device, the plurality of computing devices each providing a pool of individuals for the optimization problem, the individuals being individual solutions to the optimization problem, the pools collectively representing the first population.

13. The method of claim 12 wherein the plurality of computing devices perform crossover between individuals in the pools before providing the first population to the computing device.

14. One or more computer-readable media holding computer-executable instructions that when executed on a computing device solve an optimization problem for a modeled system using an adaptive mutation operator in a genetic algorithm, the media holding one or more instructions for:
   providing a first population of a plurality of individuals for an optimization problem for a modeled system using the computing device, the individuals being individual solutions to the optimization problem, the optimization problem including linear and bound constraints;
   selecting an individual for mutation, using the computing device;
   generating programmatically, using the computing device; an initial step size;
   generating programmatically, using the computing device, a plurality of random mutation direction vectors extending from a plotted location representing the individual selected for mutation, the plurality of random mutation direction vectors based on the linear and bound constraints;
   generating programmatically, using the computing device, a mutated individual and moving a distance equal to the initial step size from the plotted location representing the individual selected for mutation along a randomly chosen one of the plurality of mutation direction vectors;
   assessing programmatically, using the computing device, whether the mutated individual is in the feasible region, the feasible region representing a region encompassing acceptable solutions to the optimization problem considering the linear and bound constraints, the assessing further comprising:
      storing the mutated individual as part of second population in a computer-readable medium based on an assessment that the mutated individual is in the feasible region, or
      based on an assessment that the mutated individual is not in the feasible region, iteratively mutating a different mutated individual along the mutation direction vector using a step size programmatically reduced from the initial step size and assessing whether the different mutated individual is in the feasible region until the different mutated individual is assessed to be in the feasible region, the reduced step size based on the linear and bound constraints, and
      storing the different mutated individual as part of a second population in a computer-readable medium based on an assessment that the different mutated individual is in the feasible region; and
   using the second population to solve the optimization problem.

15. The media of claim 14, wherein the media comprises one or more instructions for:
   generating a plurality of mutation direction vectors after selecting the individual for mutation; and
   generating a different mutated individual along each of the plurality of mutation direction vectors using the initial step size.

16. The media of claim 15 wherein the media comprises one or more instructions for:
   assessing programmatically each mutated individual generated along the plurality of mutation direction vectors to determine whether each mutated individual is in the feasible region representing an acceptable solution to the optimization problem considering the linear and bound constraints;
   identifying at least one mutated individual that is not in feasible region on its selected mutation direction vector; and
   for each of the identified individuals, mutating another mutated individual along the selected mutation direction vector using a second step size programmatically reduced from the initial step size.

17. The media of claim 14, wherein the media comprises one or more instructions for:
   mutating another mutated individual along the chosen mutation direction vector using a different step size programmatically reduced from the step size used in the previous mutation based on a programmatic assessment that the mutated individual mutated using the second step size is not in the feasible region.

18. The media of claim 14, wherein the media comprises one or more instructions for:
   generating programmatically, in response to the generation of a reduced step size, at least one new mutation direction vector and at least one new mutated individual for the new mutation direction.

19. The media of claim 14 wherein the number of mutation directions is increased for each reduction in step size.

20. The media of claim 14 wherein the mutated individual is located in the feasible region and becomes part of a new population.

21. The media of claim 14 wherein the linear and bound constraints are incorporated into the calculation of the generation of the mutation direction vector.

* * * * *